United States Patent [19]

Takahama et al.

[11] Patent Number: 5,149,513

[45] Date of Patent: Sep. 22, 1992

[54] METHOD OF PREPARING INORGANIC POROUS MEMBER

[75] Inventors: Kouichi Takahama; Shozo Hirao; Masaru Yokoyama; Takashi Kishimoto; Hiroshi Yokogawa; Atsushi Makino, all of Kadoma, Japan

[73] Assignee: Matsushita Electric Works, Ltd., Osaka, Japan

[21] Appl. No.: 268,469

[22] Filed: Nov. 8, 1988

[30] Foreign Application Priority Data

Nov. 11, 1987 [JP] Japan .................. 62-284631

[51] Int. Cl.⁵ .............................. C01B 33/21
[52] U.S. Cl. ...................... 423/328; 502/80; 502/84
[58] Field of Search .......... 423/328 M, 123, ; 502/247, 80, 84

[56] References Cited

U.S. PATENT DOCUMENTS

| | | | |
|---|---|---|---|
| 3,672,833 | 6/1972 | Teichner et al. | 423/338 |
| 4,176,090 | 11/1979 | Vaughan et al. | 423/328 M |
| 4,246,139 | 1/1981 | Witt | 423/326 |
| 4,492,592 | 1/1985 | Diaz et al. | 423/437 |
| 4,515,901 | 5/1985 | Elattar | 502/84 |
| 4,619,908 | 10/1986 | Cheng et al. | 423/338 |
| 4,742,033 | 5/1988 | Harris et al. | 502/84 |
| 4,894,357 | 1/1990 | Hupe et al. | 502/10 |

FOREIGN PATENT DOCUMENTS 62-176911 8/1987 Japan .

*Primary Examiner*—Michael Lewis
*Assistant Examiner*—Stuart L. Hendrickson
*Attorney, Agent, or Firm*—Burns, Doane, Swecker & Mathis

[57] ABSTRACT

A method of preparing an inorganic porous member causes a layered inorganic compound in swelled state with a solvent contained therein to be dried in a super critical state, so as to have holes held between respective layers of the inorganic compound, whereby the layered compound can be excellently maintained with less agglomeration caused upon removal of the solvent and the hole volume in the entire inorganic porous member can be remarkably increased.

12 Claims, 5 Drawing Sheets

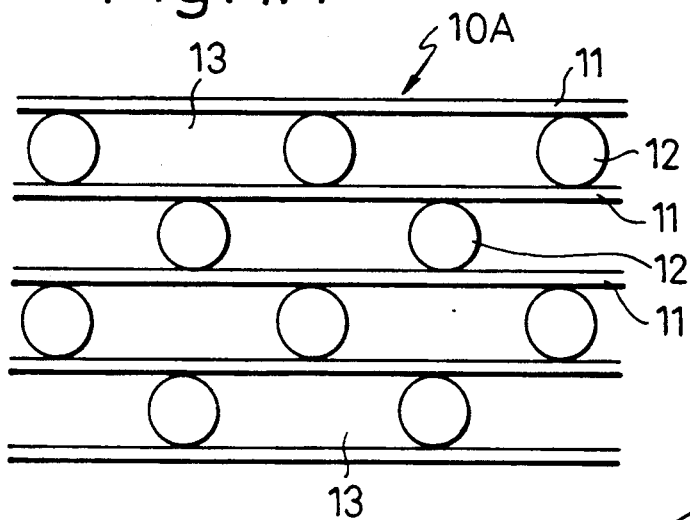
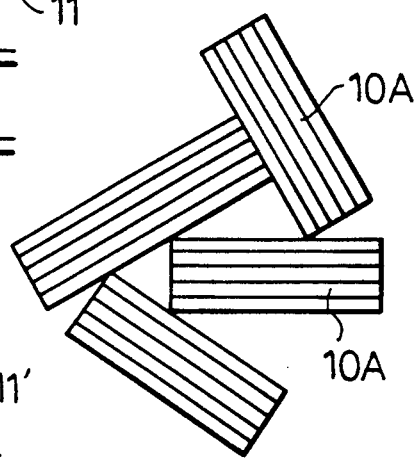
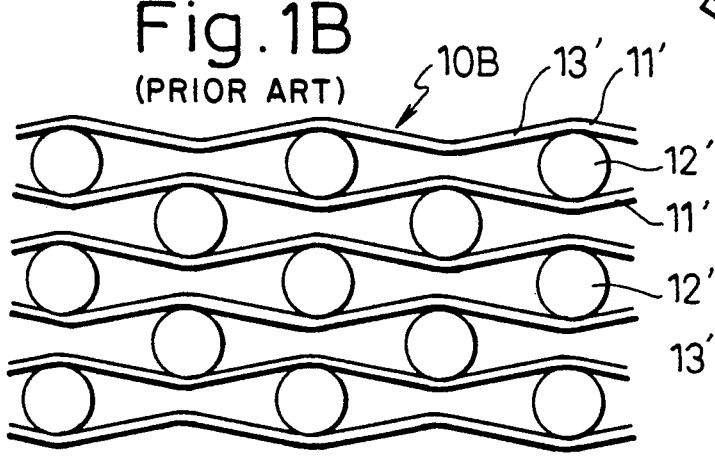
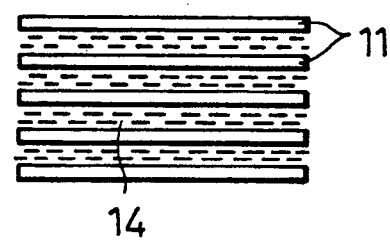

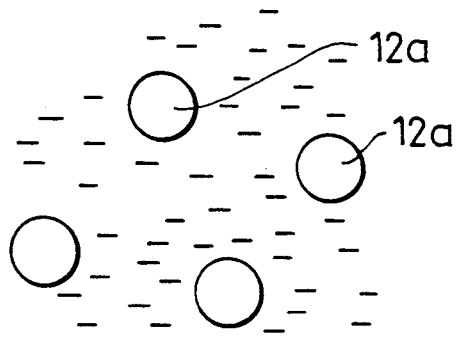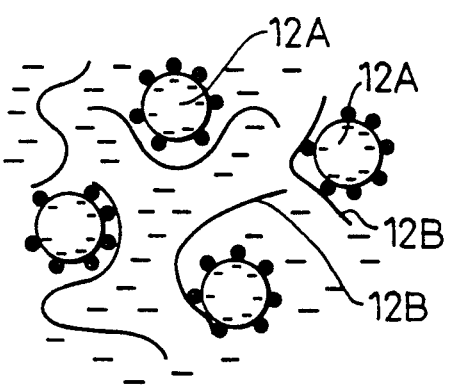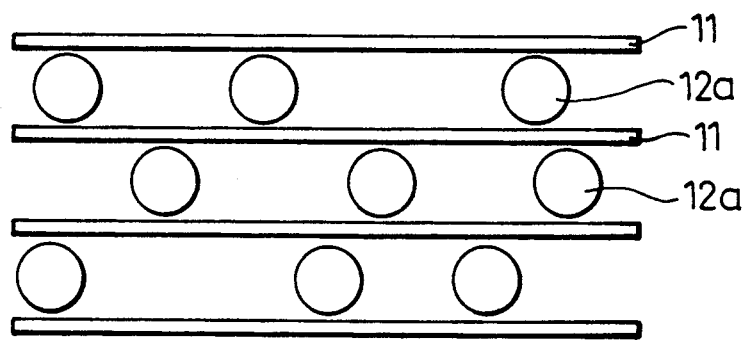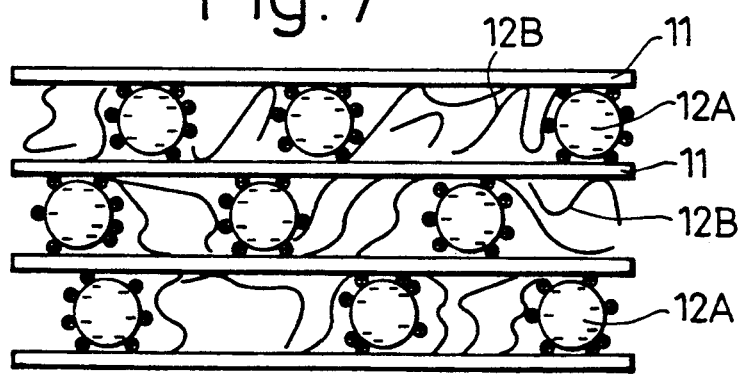

0.90° (98 Å)

METHOD OF PREPARING INORGANIC POROUS MEMBER

TECHNICAL BACKGROUND OF THE INVENTION

This invention relates to a method of preparing inorganic porous member and, more particularly, to a method in which a swelling, layered inorganic compound is made in a swelled state with a solvent contained therein and holes are positively formed between respective layers of the compound so as to have the inorganic porous member prepared.

The inorganic porous member of the kind referred to can be usefully employed as such an insulating material, catalyst, catalyst carrier or the like that shows an excellent heat insulating property or catalytic function, with the holes in the respective layers effectively utilized.

DISCLOSURE OF PRIOR ART

As an example of the method of preparing the inorganic porous member of the kind referred to, there may be enumerated a process disclosed in U.S. Pat. No. 4,176,090 granted Nov. 27, 1979 to David E. W. Vaughan et al, in which a swelling, layered inorganic compound is swelled with a solvent made to be contained in the compound, a pillar member is intercalated between the respective layers of the inorganic compound to form holes between the layers, and a functional material which performing the heat insulating property or catalytic function with the holes utilized is provided. In this known inorganic porous member of the U.S. patent, however, the volume of holes has been left to be less than about 0.8 cc/g in the volume ratio. This is considered to be due to that interlayer spaces of the compound in its swelled state cannot be maintained so as to cause the entire structure of the porous member to be deformed, due to that an agglomeration of particles forming the pillar member takes place between the particles (which shall be referred to simply as "agglomeration" hereinafter). In this case, there has been a risk that the smaller the hole volume, the more the function of the porous member deteriorated in, for example, the heat insulation.

TECHNICAL FIELD

It is a primary object of the present invention to provide a method of preparing an inorganic porous member which can satisfactorily attain the heat insulating property, catalytic function, catalyst carrying function or the like with optimumly maintained interlayer space, by means of preventing any agglomeration from taking place upon drying of the layered compound made in a swelled state with a solvent contained therein.

According to the present invention, this object can be realized by a method of preparing an inorganic porous member in which a swelling, layered inorganic compound is rendered to be in a swelled state with a solvent contained therein, and the compound in the swelled state is dried to have holes retained between the respective layers of the inorganic compound, characterized in that the drying of the layered inorganic compound in said swelled state is carried out in a super critical state.

With the foregoing method, the layered compound can be dried as being optimumly maintained in the structure without being deformed, by carrying out the drying of the swelled, layered inorganic compound in the super critical state, whereby holes of, for example, a card-house structure can be formed between the respective layers of the compound, and the hole volume can be remarkably increased.

BRIEF EXPLANATION OF DRAWINGS

FIG. 1A is a schematic diagram for explaining the structure of the layered inorganic compound in the inorganic porous member obtained through the method according to the present invention;

FIG. 1B is an explanatory view similar to FIG. 1A of the inorganic porous member but prepared without carrying out the drying in the super critical state;

FIG. 2 is a schematic side elevation of the swelling, layered inorganic compound;

FIGS. 3A and 3B are schematic diagrams showing swelling steps of the layered inorganic compound;

FIG. 4 is an explanatory view for an existing state of an inorganic pillar material formed by a colloidal inorganic compound or alcoholate I;

FIG. 5 is an explanatory view for a state in which the inorganic pillar material of FIG. 4 is inserted between the respective layers of the swelling inorganic compound;

FIG. 6 is an explanatory view for a state in which a fibrous organic pillar material is combined with a reaction product of the inorganic pillar material the surface of which is modified;

FIG. 7 is an explanatory view for a state in which the combined pillar material of FIG. 6 is inserted between the respective layers in the swelling inorganic compound;

While the present invention shall now be detailed with reference to preferred embodiments of the invention, it should be appreciated that the intention is not to limit the invention only to such embodiments but rather to include all alterations, modifications and equivalent arrangements possible within the scope of appended claims.

DISCLOSURE OF PREFERRED EMBODIMENTS

Figure 14B:
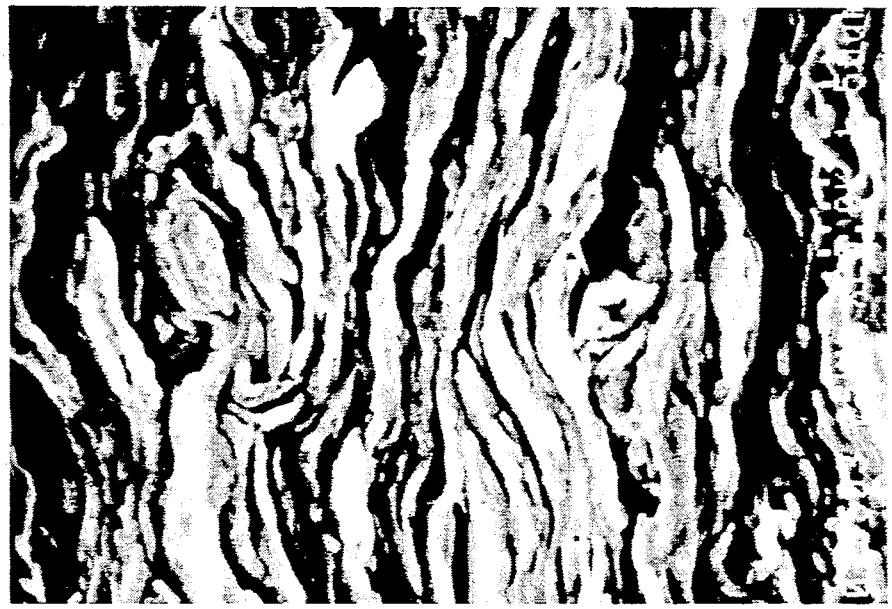
FIG. 14B is a similar scanning type electron-microscopic photograph at the magnifying power of 20,000 times but of a particle structure of the swelling, layered inorganic compound on the surface of an inorganic porous member prepared without the drying in the super critical state.
Figure 14A:
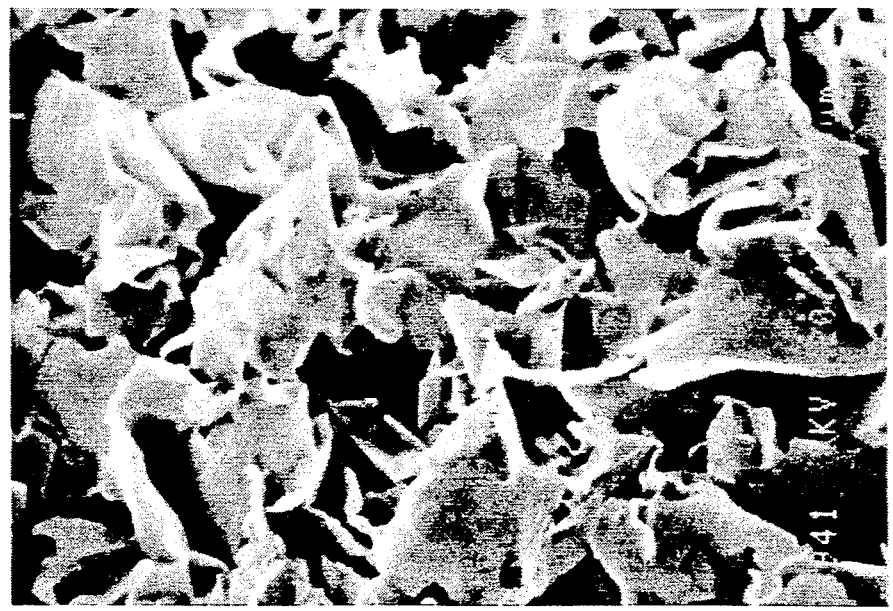
FIG. 14A is a scanning type electron-microscopic photograph at a magnifying power of 20,000 times of a particle structure of the swelling, layered inorganic compound on the surface of the inorganic porous member according to the present invention.

Referring here to a layered inorganic compound 10A obtained through the method of preparing the inorganic porous member according to the present invention, by reference to FIG. 1A, there is inserted between respective layers 11 of the inorganic compound many pillars 12, with less agglomeration caused at drying step of the compound in the super critical state, while holes 13 are held sufficiently excellently between the respective layers 11 substantially without any wavy curving or the like distortion of the layers 11. In other words, it is likely that, when the drying step is carried out not in the super critical state, as shown in FIG. 1B, inorganic compound layers 11' of layered inorganic compound 10B are caused distorted to be wavy due to the agglomeration so as to render holes 13' between the layers 11' to be narrow. According to the present invention, however, the holes 13 can be sufficiently widely retained, so as to be able to improve the hole volume to a large extent. In a microscopic view, the inorganic porous member obtainable through the method according to the present invention is obtained in an assemblage of a petaline shape, locust-feather-like shape, card-house structure, spongy structure or any equivalent aspect in which several sheets of the swelling, layered inorganic compound are joined into a particle by themselves or with any proper pillars inserted between the respective layers of the compound. This will be made clear by reference to an illustrated particle structure in FIG. 14A of the swelling, layered inorganic compound according to the present invention in the case where the drying is carried out in the critical state, in comparison with the other illustrated particle structure in FIG. 14B of the compound in an event where the drying is not carried out in the critical state. In this inorganic porous member, further, the layered inorganic compound shows a hole distribution having peaks with mutual repetition in a range of 100 to several thousand nm, more concretely 100 to 1,000 nm, while the hole distribution between the inorganic compound layers is of peaks in a range of several nm to several ten nm, or more concretely 6 to 20 nm.

In the case of the inorganic compound 10B of FIG. 1B the drying of which has been carried out not in the super critical state, further, mutual contacting area between the respective layers 11' and the pillars 12' is increased due to the wavy distortion taken place in the layers 11', so that, when an eventual product is used as a heat insulating material, for example, the heat transfer rate between solid members is caused to be apt to increase. In the inorganic compound 10A of FIG. 1A according to the present invention, on the other hand, there occurs no wavy distortion in the layers 11 so that the contacting area between the layers 11 and the pillars 12 is made smaller and the heat transfer rate between solid members is also decreased.

For the swelling, layered inorganic compound, such materials as Na-montmorillonite, Ca-montmorillonite, 3-octahedron synthetic smectite (such as synthetic saponite, Na-hectorite, Li-hectorite, Na-taeniolite, Li-taeniolite or the like) acid clay, synthetic mica and the like may be enumerated, while any other substance may be employed so long as the same is the swelling and layered inorganic compound. When such hard-swelling one of the layered compounds as Ca-montmorillonite, terra abla or the like is used, it is necessary to apply thereto a strong shearing force by means of kneading or the like when the compound is swelled. Since 3-octahedron synthetic smectite, on the other hand, is a synthetic substance differing from such natural substance as Na- or Ca-montmorillonite, the substance contains only an extremely small amount of such impurities as iron and the like and is of extremely small particles, so that the inorganic porous member obtainable from this substance will have a high transparency so as to be translucent. The synthetic saponite, for example, of 3-octahedron synthetic smectite is of a three-layer structure having a so-called Mg octahedron in the center and two of Si tetrahedron disposed on both sides of the Mg octahedron. This synthetic saponite is of extremely small particles of a size about 1/10 to 1/20 of, for example, Na-montmorillonite or synthetic mica, so that the layered inorganic compound 10A showing, for example, a card-house state will be formed to have the holes with a sufficient volume. It should be here appreciated that such compound makes it possible to obtain the inorganic porous member high in, for example, the heat insulating property.

For the inorganic pillar material to be inserted between the respective layers 11 of the swelling inorganic compound, there may be employed a colloidal state inorganic compound, hydrolyzate of alcoholate (the term "alcoholate I" employed in the present specification indicates the alcoholate for use as the inorganic pillar) and the like. For the colloidal state inorganic compound, while not to be limited, it may be possible to employ a thermally stable oxide, any thermally expansible substance or any substance useful as a catalyst, and there may be enumerated such materials as $SiO_2$, $Sb_2O_3$, $Fe_2O_3$, $Al_2O_3$, $TiO_2$, $ZrO_2$ and the like, which may be employed alone or in a mixture of two or more of them. The grain size of the colloidal state inorganic compound should preferably be about 50 to 150 Å, but the size should not be limited only to this range. For the alcoholate I, on the other hand, such ones as $Si(OC_2H_5)_4$, $Si(OCH_3)_4$, $Ge(OC_3H_7)_4$, $Ge(OC_2H_5)_4$, $Ti(OC_3H_7)_4$ and the like can be used but any other material which acts similarly to the alcoholate I may be employed.

While the foregoing inorganic pillar material as it stands may be inserted between the respective layers of the swelling inorganic compound, it is also possible to insert the material after treating pillar surface through a modifying step with at least one of cationic inorganic compound, another alcoholate than the alcoholate I (which shall be hereinafter referred to as "alcoholate II") and an ester. For the cationic inorganic compound used for the surface modification of the inorganic pillar material, there may be enumerated respective compounds of titanium, zirconium, hafnium, iron, copper, chromium, nickel, zinc, aluminum, manganese, phosphorus, boron and the like. For example, such metallic chloride as $TiCl_4$, such metallic oxychloride as $ZrOCl_2$, nitrate chloride and the like may be enumerated while not required to be limited to them. For the alcoholate II, it may be possible to employ such material as $Ti(OR)_4$, $Zr(OR)_4$, $PO(OR)_3$, $B(OR)_3$ and the like, more concretely, for example, $Ti(OC_3H_7)_4$, $Zr(OC_3H_7)_4$, $PO(OCH_3)_4$, $PO(OC_2H_5)_4$, $B(OCH_3)_4$, $B(OC_2H_5)_4$ and the like, while some others can be also employed. They may be employed respectively alone or in a mixture of at least two or more of them.

For the pillar 12B, further, it may be possible to employ at least one of organic pillar material selected from a group consisting of water-soluble polymeric compound, quarternary ammonium salt, higher fatty acid, ampholytic surface active agent and choline compound, the material being employed alone or together with the inorganic pillar material. For the water-soluble polymeric compound, there may be enumerated polyvinyl alcohol, polyethylene glycol, ployethylene oxide, methyl cellulose, carboxymethylcellulose, polyacrylic acid, polyacrylic acid soda, polyacrylamide, polyvenyl pyrrolidone and the like.

For quarternary ammonium salt and higher fatty acid, it is preferable that they are ones which have such radical as octadecyl radical, hexadecyl radical, tetradecyl radical, dodecyl radical and the like. More concretely, as the quarternary ammonium salt, octadecyl trimethyl ammonium salt, dioctadecyl dimethyl ammonium salt, hexadecyl trimethyl ammonium salt, dihexadecyl dimethyl ammonium salt, tetradecyl trimethyl ammonium salt, ditetradecyl dimethyl ammonium salt or the like may be used, and, as the higher fatty acid, palmitic acid, stearic acid, oleic acid, linoleic acid or the like may be used.

For the choline compound, $[HOCH_2CH_2N(CH_3)_3]^+OH^-$, $C_5H_{14}ClNO$, $C_5H_{14}NOC_4H_5O_6$, $C_5H_{14}NOC_6H_7O_7$ and $C_5H_{14}NOC_6H_{12}O_7$ are preferable ones, while not required to be limited to them. For the ampholytic surface active agent, further, a substance having a cationic part of aliphatic amine type and an anionic part of a substance having at least one group selected from a group consisting of carboxyl group, sulfate group, sulfone group, phosphate ester group may be employed, while not limited to this.

It should be appreciated that the organic pillar material may not be limited to those referred to in the above, but any other material will be employable so long as the same can be inserted between the layers of the swelling inorganic compound.

The method of preparing the inorganic porous member shall be detailed with reference to the accompanying drawings. Referring now to FIG. 2, such mineral as a swelling clay is an assemblage of the swelling, layered inorganic compound 10A as shown in FIG. 1A. This inorganic compound 10A forming a main part of the inorganic porous member is mixed with such solvent as water and, if required, further kneaded, and the compound is preliminarily swelled with the solvent 14 caused to be contained between the respective layers 11 of the inorganic compound, so as to shift from the state of FIG. 3A to that of FIG. 3B. For the solvent, generally water is employed, but any other polar solvent such as methanol, ethanol, DMF, DMSO, acetone or the like can be used respectively alone or in a mixture of at least two or more.

In an event where a polymer of the alcoholate I, for example, is used as the pillar 12, such a solvent as ethanol, isopropyl alcohol or the like is added to the alcoholate I to mix it, the thus solved alcoholate I is mixed with water and such reactive catalyst as hydrochloric acid or the like, i.e., a hydrolyzing catalyst added, so as to be an inorganic pillar material obtained through the hydrolyzing reaction. In this case, the hydrolyzing reaction should preferably be carried out at a temperature of about 70° C., while not required to be specifically limited thereto. Further, at a stage where the hydrolyzing reaction of the inorganic pillar material has progressed to some extent and cores 12a have grown as shown in FIG. 4, the alcoholate II or cationic inorganic compound is added to the reacting solution so that the compound will be applied to the surface of the cores 12a, and then such inorganic pillar material 12A as will be seen in FIG. 6 is obtained as a reaction product carrying positive charge on the core surface. As required, the thus prepared inorganic pillar material 12A is made to coexist with an organic pillar material 12B consisting of a water-soluble polymeric compound, quarternary ammonium salt or the like.

Figure 8:
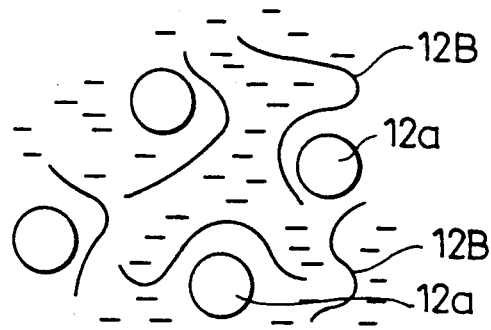
FIG. 8 is an explanatory view for a state in which an organic pillar material is combined with a fibrous inorganic pillar material formed by hydrolyzing a colloidal inorganic compound or alcoholate I.

When the colloidal inorganic compound the surface of which is cation is employed as the inorganic pillar material, this compound may be utilized in the state of FIG. 4, that is, without causing such reaction as in FIG. 6. Further, the alcoholate II or the cationic inorganic compound is added to a dispersion of anionic colloidal inorganic compound, so that the latter compound may be employed as the inorganic pillar material of a reaction product obtained through the reaction of the added compound as applied to the surface of the cores 12a. Alternatively, as shown in FIG. 8, the pillar material may be the one in which an organic pillar material is made to coexist with such unmodified cores 12a as shown in FIG. 4.

A mixture of such composition as has been disclosed is mixed with the foregoing swelling, layered inorganic compound which has been preliminarily swelled, so that an intercalation reaction of the mixture will take place between the respective layers of the compound. In this case, the mixing should preferably be made at a temperature of about 60°–70° C., while not limited to this range. When such unmodified cores 12a as in FIG. 4 are used here, the cores 12a as they stand will act as the pillars which enter between the respective layers 11 of the compound as shown in FIG. 5, so that holes 13 will be optimumly kept between the layers 11. In the case where the water-soluble polymeric compound or the quarternary ammonium salt is mixed as the organic pillar material, interlayer space of the compound layers 11 will be expanded or maintained at least by the organic pillar material 12B as will be clear in FIG. 7 or 9 and any movement of the inorganic pillar material 12A can be thereby restricted. When the inorganic pillar material 12A is the reaction product of the surface modification, the surfacial positive charge on the pillars will be electrically coupled to negative part of the compound layers 11, so that the inorganic pillar material 12A can be brought into reliable contact with the compound layers 11 to be thereby well retained even the contacting area itself is made smaller so as to expand the holes 13.

Figure 9:
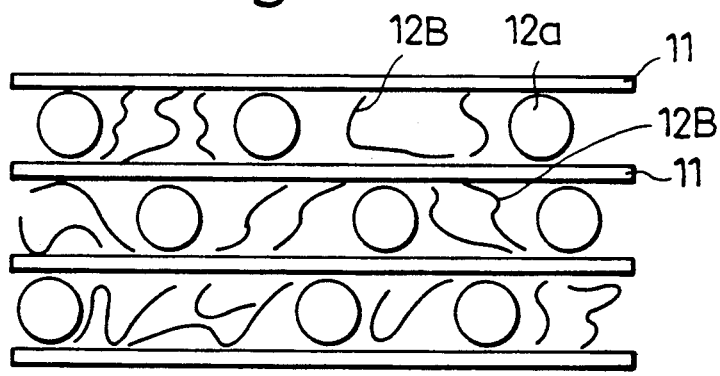
FIG. 9 is an explanatory view for a state in which the combined pillar material of FIG. 8 is inserted between the respective layers of the swelling inorganic compound.

The reactive solution referred to in the above with reference to FIGS. 5, 7 and 9 is subjected to a centrifugal separation, the compound thereby gelled is made into a plate shape by means of a spatula or the like, and this plate-shaped inorganic compound is subjected to the drying in the super critical state. Here, the super critical state is to include not only the state exceeding the critical point but also the one exactly on the critical point. As a measure for preparing the super critical state, there may be enumerated a method in which such solvent held by and contained in the swelling layered compound as water contained between the inorganic compound layers is directly heated under a pressure to have a state of the solvent exceeding the critical point reached. This method requires, however, a special autoclave for the drying since the critical point of water is high to be 374.2° C. in the critical temperature and 217.6 atm in the critical pressure. In order to avoid the use of any special autoclave, water as the solvent held in the swelling, layered compound is substituted for by, for example, ethanol, thereafter carbon dioxide of a low critical point is added continuously so as to gradually substitute carbon dioxide for ethanol under the heating and pressurizing at levels exceeding the critical point of carbon dioxide to have a state exceeding the critical point realized. In this case, carbon dioxide exceeding the critical point may be fed into the system for the substitution. In any event, the fluidic solvent in the super critical state is made to be discharged out of the system to complete the drying.

By the employment of the foregoing drying method, it is made possible to prevent the agglomeration apt to occurring upon the drying, and the inorganic porous member extremely high in the porosity can be attained. For the fluid used for carrying out the drying in the super critical state, any other fluid than that in the above may be employed. For example, methanol, dichlorodifluoromethane, ethylene or the like may be used respectively alone or in a mixture of at least two or more, other than the foregoing ethanol and carbon dioxide.

Figure 10:
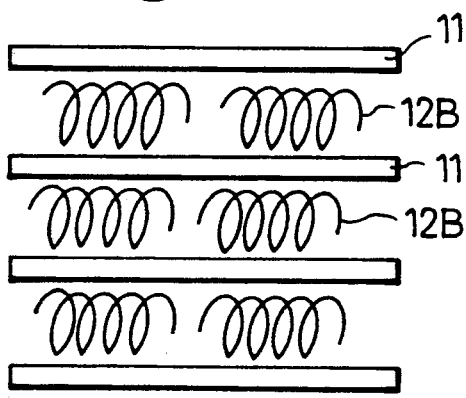
FIG. 10 is a schematic diagram showing a state in which a fibrous organic pillar material is inserted between the respective layers of a swelling inorganic compound.

When the drying is performed with the optimumly selected conditions for the super critical state prepared as in the above, further, it is possible to extract any organic substance contained between the respective layers of the inorganic compound into the fluid in the super critical state. Accordingly, it becomes possible that the organic pillar material acting to expand and maintain the interlayer space of the compound is extracted and removed, whereby the organic pillar can be removed out of the inorganic porous member after being dried even when such calcining step as that carried out by means of an electric furnace, for example, is omitted, and it is made possible to prevent the organic pillar material from remaining as carbonized after the calcination between the compound layers so as not to be utilizable any more as the catalyst. Since, in this case, the calcining step can be made unnecessary, it is also made possible to prepare the layered compound 10A by disposing only the organic pillar material 12B between the respective layers 11 of the inorganic compound as shown in FIG. 10. In Table I as follows, the critical conditions for main ones of the fluid are shown:

TABLE I

| Type of Fluid | Critical Temp. (°C.) | Critical Press. (atm) |
|---|---|---|
| Water | 374.2 | 217.6 |
| Ethanol | 240.0 | 78.7 |
| Methanol | 243.1 | 63.1 |
| Carbon dioxide | 31.1 | 72.8 |
| Dichlorodifluoromethane | 119.9 | 40.7 |

In the inorganic porous member obtained through the foregoing method according to the present invention, the porous structure before the drying performed in the super critical state can be maintained to be substantially identical, so that the volume of the holes can be remarkably increased as compared with that of the member obtained through any known hot-air or freeze drying, and the member can be made excellent in the heat insulation property, catalytic and catalyst carrying function.

More concrete examples of the method according to the present invention as well as comparative examples to the former examples shall now be detailed in the followings.

EXAMPLE 1

To $Si(OC_2H_5)_4$ as an alcoholate I (a product of Japanese firm, NAKARAI CHEMICAL), ethanol (a guaranteed reagent made by NAKARAI CHEMICAL) was added and they were sufficiently mixed to be a solution, about 5 ml of 2N hydrochloric acid was added to this solution while heating them to be 70° C., and the solution was subjected to a hydrolytic reaction to form cores of inorganic pillar material. Then, a 4M aqueous solution of $TiCl_4$ as a cationic inorganic compound (by NAKARAI CHEMICAL) was added to the solution, they were sufficiently mixed to have them reacted with each other and a reaction liquid with a reaction product dispersed therein was obtained. This reaction liquid was mixed with a 0.8 weight % aqueous solution of Na-montmorillonite (a product of Japanese firm, KUNIMINE IND., sold under a trademark "KUNIPIA-F") as a swelling layered compound which was preliminarily swelled with water, and the mixture was subjected to an insertion reaction at 60° C. for 1.5 hours.

After the reaction, the mixture was repeatedly subjected several times to washing by means of ethanol and centrifugal separation, thus separated mixture was orientated to be plate-shaped by means of a spatula, the plate-shaped mixture was dried at 40° C. under 80 atm for 8 hours while adding thereto carbon dioxide of a relatively low critical point, and a sample inorganic porous member was obtained. Composition ratio of respective components was made, in M-ratio, at $Si(OC_2H_5)_4$:ethanol:2N hydrochloric acid:$TiCl_4$ = 17:18:65:1.7, while composition ratio of Na-montmorillonite and $SiO_2$ was made 1:0.6 in weight ratio.

EXAMPLE 2

Except that the washing was carried out with methanol, another sample inorganic porous member was obtained in the same manner as in the foregoing EXAMPLE 1.

EXAMPLE 3

Except that the drying was carried out at 270° C. under 120 atm for 72 hours and with ethanol left contained, another sample of the inorganic porous member was obtained in the same manner as in the foregoing Example 1.

EXAMPLE 4

Except for the washing carried out with methanol instead of ethanol, another sample inorganic porous member was obtained in the same manner as in Example 3.

EXAMPLE 5

Except for a use, in forming the cores of the inorganic pillar material, of a 4M aqueous solution of $TiCl_4$ (by NAKARAI CHEMICAL) as the cationic inorganic compound, another sample inorganic porous member was obtained in the same manner as in the foregoing Example 1.

EXAMPLE 6

Except for a use, in forming the cores of the inorganic pillar material, of titania-zirconia coat silica sol (a product of Japanese firm, NISSAN CHEMICAL, sold under a trademark "SNOWTEX TZK") as a colloidal inorganic compound, another sample inorganic porous member was obtained in the same manner as in the foregoing Example 1.

EXAMPLE 7

Except for a use of $Ti(OC_3H_7)_4$ in place of $TiCl_4$, another sample inorganic porous member was obtained in the same manner as in Example 5 above.

EXAMPLE 8

Except that octadecyl trimethyl ammonium chloride (by Japanese firm, NIPPON OIL & FATS, as "CATION AB") as a quarternary ammonium salt which is the organic pillar material was mixed sufficiently with the reactive liquid of $TiCl_4$ and that the composition ratio of the reactive liquid containing Na-montmorillonite, $SiO_2$, octadecyl trimethyl ammonium chloride is made 1:0.6:1 in weight ratio, another sample inorganic porous member was obtained in the same manner as in the foregoing Example 1.

EXAMPLE 9

Except for the washing carried out with methanol instead of ethanol, another sample inorganic porous member was obtained in the same manner as in Example 8 above.

EXAMPLE 10

Except for the drying carried out at 270° C. under 120 atm for 72 hours and with ethanol left contained, another sample inorganic porous member was obtained in the same manner as in Example 8 above.

EXAMPLE 11

Except for the washing performed with methanol instead of ethanol, another sample inorganic porous member was obtained in the same manner as in Example 10 above.

EXAMPLE 12

Except that, in forming the cores of the inorganic pillar material, the same 4M aqueous solution of $TiCl_4$ as that in Example 5 was employed as the cationic inorganic compound, still another sample inorganic porous member was obtained in the same manner as in Example 8 above.

EXAMPLE 13

Except for a use of the same titania-zirconia coat silica sol as in Example 6 above as the colloidal inorganic compound for forming the inorganic pillar material core, a still further example of the inorganic porous member was obtained in the same manner as in Example 8 above.

EXAMPLE 14

Except for a use of $Ti(OC_3H_7)_4$ in place of $TiCl_4$, another sample inorganic porous member was obtained in the same manner as in Example 8 above.

EXAMPLE 15

Except for a use of stearic acid (reagent by NAKARAI CHEMICAL) in place of quarternary ammonium salt as the organic pillar material, another sample inorganic porous member was obtained in the same manner as in Example 8 above.

EXAMPLE 16

The same 0.8 weight % aqueous solution as in Example 1 of Na-montmorillonite as one of the swelling, layered compound was adjusted, 5 ml of HCl of 2N was added to the adjusted solution, which was then subjected to the centrifugal separation for several times and to a washing with ethanol for several times, a gelatinized sample thus obtained was orientated to be plate-shaped with a spatula, the plate-shaped sample was dried at 40° C. under 80 atm for 8 hours while adding thereto carbon dioxide of a relatively low critical point, and another inorganic porous member sample was obtained.

EXAMPLE 17

Except for a use of Ca-montmorillonite in place of Na-montmorillonite as being one of the swelling, layered inorganic compound, another sample of the inorganic porous member was obtained in the same manner as in Example 16 above.

EXAMPLE 18

Except for the washing made with methanol instead of ethanol, another sample of the inorganic porous member was obtained in the same manner as in Example 16 above.

EXAMPLE 19

Except for the drying performed without using carbon dioxide and with ethanol left contained and at 270° C. under 120 atm for 72 hours, another sample member was obtained in the same manner as in Example 16 above.

EXAMPLE 20

Except for a use of a synthetic mica (by Japanese firm, TOPY IND., under a trademark TSM TETRA SILISIC MICA) in place of Na-montmorillonite, another sample member was obtained in the same manner as in Example 19 above.

EXAMPLE 21

The same aqueous solution adjusted of Na-montmorillonite as in Example 16 was mixed with a 10% aqueous solution of polyvinyl alcohol (a reagent by NAKARAI CHEMICAL, polymerization degree of 500) so as to be 1:1 in weight ratio, and the intercalation reaction was carried out. After the reaction, the mixture solution was subjected to repetitive washing with ethanol and centrifugal separation and a gelatinized sample was obtained. Such sample was orientated with a spatula and was thereafter dried at 40° C. under 80 atm for 8 hours while adding thereto of carbon dioxide of the relatively low critical point, and a sample of the inorganic porous member was obtained.

EXAMPLE 22

Except for a use of Ca-montmorillonite (by KUNIMINE IND. under a trademark KUNIBOND) in place of the aqueous solution of Na-montmorillonite as being one of the swelling, layered inorganic compound, another sample porous member was obtained in the same manner as in Example 21 above.

EXAMPLE 23

Except for a use of the same octadecyl trimethyl ammonium chloride as in Example 8 in place of polyvinyl alcohol, another sample porous member was obtained in the same manner as in Example 21.

EXAMPLE 24

Except for a use of the same stearic acid as in Example 15 in place of polyvinyl alcohol, another sample porous member was obtained in the same manner as in Example 21.

EXAMPLE 25

Except that the drying was carried out without adding any carbon dioxide but with ethanol left contained and at 270° C. and 120 atm for 72 hours, another sample porous member was obtained in the same manner as in Example 17.

EXAMPLE 26

Except that the cores of the inorganic pillar material were formed with the same $Ti(OC_3H_7)_4$ as in Example 7 in a composition of 1:12.5 in weight ratio for $Ti(OC_3H_7)_4$ and 2N hydrochloric acid, another sample porous member was obtained in the same manner as in Example 1.

EXAMPLE 27

Except for a use of the same titania-zirconia coat silica sol as in Example 6 for forming the cores of the inorganic pillar material, another sample porous member was obtained in the same manner as in Example 26.

EXAMPLE 28

Except for an additional use of the same octadecyl trimethyl ammonium chloride as in Example 8 for forming the cores of the inorganic pillar material, another sample porous member was obtained in the same manner as in Example 26.

EXAMPLE 29

Except that a synthetic saponite (by KUNIMINE IND. under a trademark SMECTON-SA) was employed in place of Na-montmorillonite as the swelling, layered compound to be preliminarily swelled with water and the reaction liquid was made to be of a composition of 1:0.6 in weight ratio for the synthetic saponite and $SiO_2$, another sample member was obtained in the same manner as in the foregoing Example 1.

EXAMPLE 30

Except for a use of RAPONITE-RD (by a Japanese firm, NIPPON SILICA IND.) which is a synthetic smectite, in place of SMECTON-SA, another sample member was obtained in the same manner as in Example 29.

EXAMPLE 31

Except that the drying was made without addition of carbon dioxide but with ethanol left contained and at 270° C. under 120 atm for 72 hours, another sample member was obtained in the same manner as in Example 29.

EXAMPLE 32

Except for a use of the same titania-zirconia coat silica sol as in Example 6 as the colloidal inorganic compound for forming the cores of the inorganic pillar material, another sample member was obtained in the same manner as in Example 29.

EXAMPLE 33

Except for a use of $Ti(OC_3H_7)_4$ in place of $TiCl_4$, another sample member was obtained in the same manner as in Example 29.

EXAMPLE 34

Except for a use of the same synthetic saponite as in Example 29 in place of Na-montmorillonite as the swelling, layered compound to be preliminarily swelled, and for such composition of the reactive liquid as synthetic saponite, $SiO_2$ and octadecyl trimethyl ammonium chloride at 1:0.6:1 in weight ratio, another sample member was obtained in the same manner as in Example 8.

EXAMPLE 35

Except for a use of the same RAPONITE-RD as in Example 30 which is the synthetic smectite, in place of SMECTON-SA, another sample member was obtained in the same manner as in Example 34.

EXAMPLE 36

Except that the drying was carried out without adding carbon dioxide but with ethanol left contained and at 270° C. under 120 atm for 72 hours, another sample member was obtained in the same manner as in Example 34.

EXAMPLE 37

Except for a use of the same titania-zirconia coat silica sol as in Example 6 which is the colloidal inorganic compound for forming the cores of the inorganic pillar material, another sample member was obtained in the same manner as in Example 34.

EXAMPLE 38

Except for a use of the same stearic acid as in Example 15 as the organic pillar material, in place of quarternary ammonium salt, another sample member was obtained in the same manner as in Example 34.

EXAMPLE 39

Except for a use of the aqueous saponite solution of Example 29 instead of the Na-montmorillonite solution, another sample member was obtained in the same manner as in Example 16.

EXAMPLE 40

Except for a use of the same RAPONITE-RD as in Example 30 which is the synthetic smectite, in place of SMECTON-SA, another sample member was obtained in the same manner as in Example 39.

EXAMPLE 41

Except that the drying was carried out without adding carbon dioxide but with ethanol left contained and at 270° C. under 120 atm for 72 hours, another sample member was obtained in the same manner as in Example 39.

EXAMPLE 42

Except that the washing was made with methanol instead of ethanol, another sample member was obtained in the same manner as in Example 39.

EXAMPLE 43

Except that the washing was made with methanol instead of ethanol, another sample member was obtained in the same manner as in Example 41.

EXAMPLE 44

Except for a use of the same aqueous saponite solution as in Example 29 in lieu of the aqueous Na-montmorillonite solution, and for a further mixing of this aqueous solution with the same octadecyl trimethyl ammonium chloride as in Example 8 as the organic pillar material, another sample member was obtained in the same manner as in Example 16.

EXAMPLE 45

Except for a use of the same RAPONITE-RD as in Example 30 which is the synthetic smectite, in place of SMECTON-SA, another sample member was obtained in the same manner as in Example 44.

EXAMPLE 46

Except for a use of $TiCl_4$ in place of octadecyl trimethyl ammonium chloride, another sample member was obtained in the same manner as in Example 44.

COMPARATIVE EXAMPLE 1

A sample inorganic porous member was obtained in the same manner as in the foregoing Example 1, except for an employment of a hot-air drying at 60° C. for the drying of the plate-shaped mixture.

COMPARATIVE EXAMPLE 2

Another sample was obtained in the same manner as in Example 1, except for an employment of a freeze drying for the drying of the plate-shaped mixture.

COMPARATIVE EXAMPLE 3

Another sample was obtained in the same manner as in Example 7, except for an employment of the hot-air drying at 60° C.

COMPARATIVE EXAMPLE 4

Another sample was obtained in the same manner as in Comparative Example 3, except that a calcination was further carried out at 500° C. after the drying.

COMPARATIVE EXAMPLE 5

Another sample was obtained in the same manner as in Example 7, except for an employment of the freeze drying.

COMPARATIVE EXAMPLE 6

Another sample was obtained in the same manner as in Comparative Example 5, except that a calcination was further carried out at 500° C. after the drying.

COMPARATIVE EXAMPLE 7

Another sample was obtained in the same manner as in Example 16, except for an employment of a hot-air drying at 60° C.

COMPARATIVE EXAMPLE 8

Another sample was obtained in the same manner as in Example 16, except for an employment of a freeze drying.

COMPARATIVE EXAMPLE 9

Another sample was obtained in the same manner as in Example 21, except for an employment of the hot-air drying at 60° C.

COMPARATIVE EXAMPLE 10

Another sample was obtained in the same manner as in Example 21, except for an employment of freeze drying.

COMPARATIVE EXAMPLE 11

Still another sample of the inorganic porous member was obtained with an activated charcoal of coconut shell available in the market.

In respect of the samples obtained through the respective Examples described where any organic pillar material has been employed, such organic material has been made to be removed from the interlayer spaces of the compound at the same time when the drying was carried out.

Figure 12:
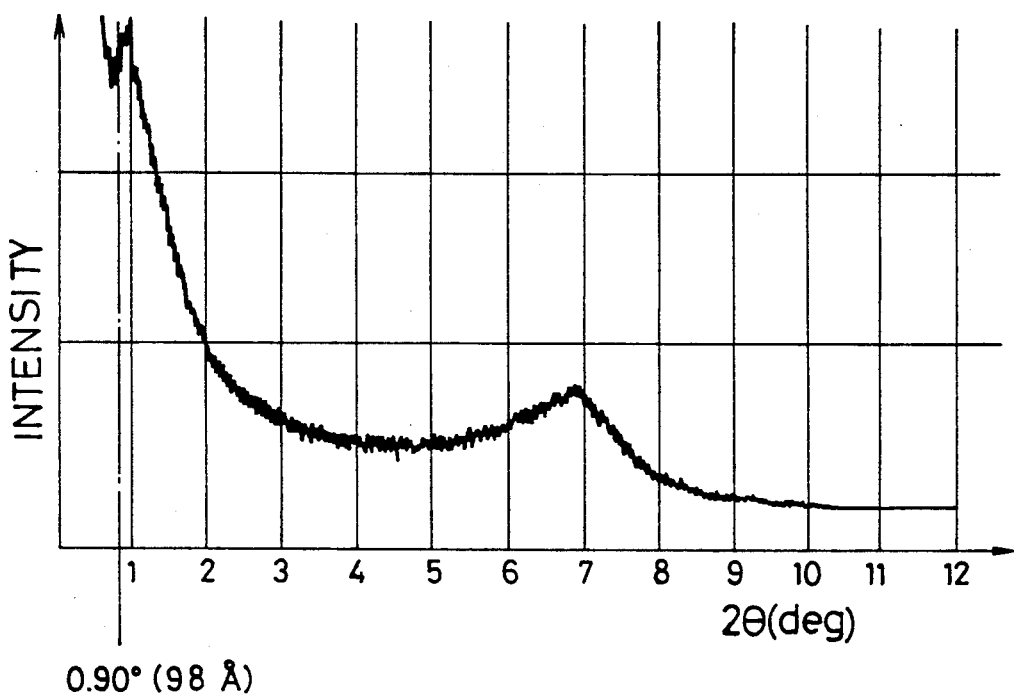
FIG. 12 is a diagram showing X-ray diffraction measurement showing peaks appearing in correspondence to the interlayer holes in the swelling inorganic compound.
Figure 13:
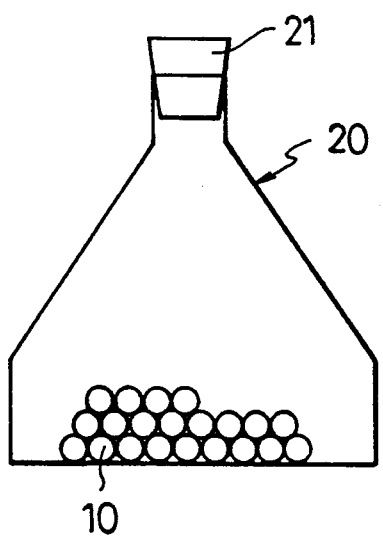
FIG. 13 is an explanatory view for a deodorizing experiment with respect to the inorganic porous member obtained through the method according to the present invention.

In Tables II–VI given in the followings, there are shown respective results of measurement of specific surface, hole volume, interlayer space, apparent density and heat conductivity in respect of the respective plate-shaped samples of the inorganic porous member obtained through the foregoing Examples and Comparative Examples. For the specific surface and hole volume, a so-called BET method in the nitrogen adsorbing method has been employed, while the interlayer space has been obtained by measuring the space between bottom surfaces of the layers (d001) with respect to such a diagram as shown in FIG. 12 of X-ray diffraction. For the heat conductivity, the measurement was made by a thermal current metering method based on ASTM-C-518. For measuring equipments practically employed, an AUTOSOVE 6 (Trademark) of a U.S. firm Quanta-Chrome has been used for the nitrogen adsorbing method, an equipment by a Japanese firm RIGAKU DENKI for the X-ray diffraction, a device known as HC-070H (Trademark) by a Japanese firm EIKO SEIKI for the heat conductivity measurement, and a super critical fluid extracting device (16 lit. type) by a Japanese firm SUMITOMO JUKI for the super critical drying.

TABLE II

| EX. | System | Specif. sur. [m²/g] | Hole vol. [cc/g] | Int'layer space d001 [Å] | App. dens. [g/cc] | Heat con. [Kcal/mhr °C.] |
|---|---|---|---|---|---|---|
| 1. | $Si(OC_2H_5)_4$ + $TiCl_4$ + [ethanol.$CO_2$] | 458 | 1.13 | 90~100 | 0.12 | 0.021 |
| 2. | $Si(OC_2H_5)_4$ + $TiCl_4$ + [methanol.$CO_2$] | 450 | 1.10 | 90~100 | 0.12 | 0.022 |
| 3. | $Si(OC_2H_5)_4$ + $TiCl_4$ + [ethanol.$CO_2$] | 435 | 1.08 | 90~100 | 0.13 | 0.022 |
| 4. | $Si(OC_2H_5)_4$ + $TiCl_4$ + [methanol.$CO_2$] | 434 | 1.07 | 90~100 | 0.13 | 0.023 |

TABLE II-continued

| EX. | System | Specif. sur. [m²/g] | Hole vol. [cc/g] | Int'layer space d001 [Å] | App. dens. [g/cc] | Heat con. [Kcal/mhr °C.] |
|---|---|---|---|---|---|---|
| 5. | $TiCl_4$ + [ethanol.$CO_2$] | 417 | 1.00 | 90~100 | 0.13 | 0.025 |
| 6. | TZK + [ethanol.$CO_2$] | 243 | 0.98 | 60~70 | 0.23 | 0.028 |
| 7. | $Si(OC_2H_5)_4$ + $Ti(OC_3H_7)_4$ + [ethanol.$CO_2$] | 460 | 1.15 | 90~100 | 0.12 | 0.016 |
| 8. | $Si(OC_2H_5)_4$ + $TiCl_4$ + octadecyl + [ethanol.$CO_2$] | 348 | 1.20 | 90~100 | 0.20 | 0.032 |
| 9. | $Si(OC_2H_5)_4$ + $TiCl_4$ + octadecyl + [methanol.$CO_2$] | 345 | 1.19 | 90~100 | 0.21 | 0.033 |
| 10. | $Si(OC_2H_5)_4$ + $TiCl_4$ + octadecyl + [ethanol.$CO_2$] | 340 | 1.18 | 90~100 | 0.21 | 0.032 |
| 11. | $Si(OC_2H_5)_4$ + $TiCl_4$ + octadecyl + [methanol.$CO_2$] | 340 | 1.18 | 90~100 | 0.22 | 0.033 |
| 12. | $TiCl_4$ + octadecyl + [ethanol.$CO_2$] | 323 | 1.08 | 90~100 | 0.23 | 0.033 |
| 13. | TZK + $TiCl_4$ + octadecyl + [ethanol.$CO_2$] | 350 | 1.20 | 90~100 | 0.20 | 0.032 |
| 14. | $Si(OC_2H_5)_4$ + $Ti(OC_3H_7)_4$ + octadecyl + [ethanol.$CO_2$] | 283 | 1.07 | 60~70 | 0.31 | 0.034 |
| 15. | $Si(OC_2 + H_5)_4$ + $TiCl_4$ + stearic acid + [methanol.$CO_2$] | 348 | 1.19 | 90~100 | 0.21 | 0.033 |

Throughout the above Examples, Na-montmorillonite has been commonly employed, and the drying in the critical state has been of course carried out.

TABLE III

| EX. | System | Specif. sur. [m²/g] | Hole vol. [cc/g] | Int'layer space d001 [Å] | App. dens. [g/cc] | Heat con. [Kcal/mhr °C.] |
|---|---|---|---|---|---|---|
| 16. | Na-montmorillonite + [ethanol.$CO_2$] | 230 | 1.05 | 10 | 0.15 | 0.024 |
| 17. | Ca-montmorillonite + [ethanol.$CO_2$] | 170 | 1.08 | 10 | 0.13 | 0.021 |
| 18. | Na-montmorillonite + [methanol.$CO_2$] | 220 | 1.12 | 10 | 0.18 | 0.022 |
| 19. | Na-montmorillonite + [ethanol] | 230 | 1.00 | 10 | 0.14 | 0.023 |
| 20. | Synthetic mica + [ethanol] | 230 | 0.98 | 10 | 0.17 | 0.024 |
| 21. | Na-montmorillonite + PVA + [ethanol.$CO_2$] | 280 | 1.09 | 16 | 0.14 | 0.021 |
| 22. | Ca-montmorillonite + PVA + [ethanol.$CO_2$] | 260 | 1.12 | 14 | 0.12 | 0.020 |
| 23. | Na-montmorillonite + octadecyl + [ethanol.$CO_2$] | 340 | 1.05 | 20 | 0.15 | 0.020 |
| 24. | Ca-montmorillonite + stearic acid + [ethanol.$CO_2$] | 320 | 1.07 | 18 | 0.15 | 0.021 |
| 25. | Ca-montmorillonite + [ethanol] | 280 | 1.12 | 16 | 0.14 | 0.023 |
| 26. | Na-montmorillonite + $Ti(OC_3H_7)_4$ + [ethanol.$CO_2$] | 325 | 0.93 | 60~80 | 0.15 | — |
| 27. | Na-montmorillonite + TZK + [ethanol.$CO_2$] | 330 | 0.91 | 60~90 | 0.13 | — |
| 28. | Na-montmorillonite + $Ti(OC_3H_7)_4$ + octadecyl + [ethanol.$CO_2$] | 295 | 0.92 | 60~80 | 0.11 | — |

TABLE IV

| EX. | System | Specif. sur. [m²/g] | Hole vol. [cc/g] | Int'layer space d001 [Å] | App. dens. [g/cc] | Heat con. [Kcal/mhr °C.] |
|---|---|---|---|---|---|---|
| 29. | SMECTON-SA + $Si(OC_2H_5)_4$ + $TiCl_4$ + [ethanol.$CO_2$] | 838 | 2.90 | 90~100 | 0.21 | 0.016 |
| 30. | RAPONITE-RD + $Si(OC_2H_5)_4$ + $TiCl_4$ + [ethanol.$CO_2$] | 578 | 1.38 | 80~90 | 0.18 | 0.020 |
| 31. | SMECTON-SA + $Si(OC_2H_5)_4$ + $TiCl_4$ + [ethanol] | 810 | 2.61 | 90~100 | 0.19 | 0.018 |
| 32. | SMECTON-SA + TZK + [ethanol.$CO_2$] | 480 | 1.51 | — | 0.23 | 0.018 |
| 33. | SMECTON-SA + $Si(OC_2H_5)_4$ + $TiCl_4$ + [ethanol.$CO_2$] | 826 | 3.90 | 90~100 | 0.19 | 0.016 |
| 34. | SMECTON-SA + $Si(OC_2H_5)_4$ + $TiCl_4$ + octadecyl + [ethanol.$CO_2$] | 850 | 3.81 | 90~100 | 0.18 | 0.015 |
| 35. | RAPONITE-RD + $Si(OC_2H_5)_4$ + $TiCl_4$ + octadecyl + [ethanol.$CO_2$] | 623 | 1.58 | 80~90 | 0.20 | 0.019 |
| 36. | SMECTON-SA + $Si(OC_2H_5)_4$ + $TiCl_4$ + octadecyl + [ethanol] | 835 | 3.63 | 90~100 | 0.19 | 0.016 |
| 37. | SMECTON-SA + TZK + octadecyl + [ethanol.$CO_2$] | 503 | 1.72 | — | 0.21 | 0.018 |
| 38. | SMECTON-SA + $Si(OC_2H_5)_4$ + $TiCl_4$ + stearic acid + [ethanol.$CO_2$] | 511 | 1.60 | 90~100 | 0.18 | 0.019 |

TABLE V

| EX. | System | Specif. sur. [m²/g] | Hole vol. [cc/g] | Int'layer space d001 [Å] | App. dens. [g/cc] | Heat con. [Kcal/mhr °C.] |
|---|---|---|---|---|---|---|
| 39. | SMECTON-SA + [ethanol.$CO_2$] | 270 | 1.01 | 15 | 0.11 | 0.018 |
| 40. | RAPONITE-RD + [ethanol.$CO_2$] | 280 | 1.08 | 14 | 0.10 | 0.019 |
| 41. | SMECTON-SA + [ethanol] | 268 | 0.98 | 15 | 0.10 | 0.019 |
| 42. | SMECTON-SA + [methanol.$CO_2$] | 298 | 1.02 | 15 | 0.12 | 0.018 |
| 43. | SMECTON-SA + [methanol] | 300 | 0.99 | 15 | 0.11 | 0.020 |
| 44. | SMECTON-SA + octadecyl + [ethanol.$CO_2$] | 350 | 1.10 | 15 | 0.12 | 0.019 |
| 45. | RAPONITE-RD + octadecyl + [ethanol.$CO_2$] | 343 | 0.99 | 15 | 0.13 | 0.019 |
| 46. | SMECTON-SA + $TiCl_4$ + [ethanol.$CO_2$] | 283 | 0.99 | 60~80 | 0.09 | — |

Throughout the Examples in the above Tables III to V, too, the drying has been of course carried out in the super critical state.

TABLE VI

| EX. | System | Specif. sur. [m²/g] | Hole vol. [cc/g] | Int'layer space d001 [Å] | App. dens. [g/cc] | Heat con. [Kcal/mhr °C.] |
|---|---|---|---|---|---|---|
| 1. | $Si(OC_2H_5)_4$ + $TiCl_4$ + [hot-air dry] | 355 | 0.245 | 40 | 1.0 | 0.050 |
| 2. | $Si(OC_2H_5)_4$ + $TiCl_4$ + [freeze dry] | 325 | 0.250 | 40 | 0.22 | 0.053 |
| 3. | $Si(OC_2H_5)_4$ + $Ti(OC_3H_7)_4$ + [hot-air dry] | 78 | 0.10 | 44 & abv. | 1.2 | 0.130 |
| 4. | $Si(OC_2H_5)_4$ + $Ti(OC_3H_7)_4$ + [hot-air dry] + calcine | 605 | 0.78 | 44 & abv. | 0.71 | 0.053 |
| 5. | $Si(OC_2H_5)_4$ + $Ti(OC_3H_7)_4$ + [freeze dry] | 70 | 0.10 | 44 & abv. | 0.72 | 0.108 |
| 6. | $Si(OC_2H_5)_4$ + $Ti(OC_3H_7)_4$ + [freeze dry] + calcine | 604 | 0.78 | 44 & abv. | 0.20 | 0.038 |
| 7. | Na-montmorillonite + [hot-air dry] | 13 | 0.10 | 10 | 0.95 | 0.062 |
| 8. | Na-montmorillonite + [freeze dry] | 45 | 0.13 | 10 | 0.35 | 0.032 |
| 9. | Na-montmorillonite + PVA + [hot-air dry] | 47 | 0.14 | 10 | 0.37 | 0.073 |
| 10. | Na-montmorillonite + PVA + [freeze dry] | 61 | 0.14 | 10 | 0.30 | 0.030 |
| 11. | Activated charcoal | 600 | 1.100 | — | — | — |

In respect of the samples obtained through Examples 1, 16, 21, 26–28, 39 and 46 in the foregoing Tables II through V, measurement has been made for intercompound space, result of which has shown to be about 100–500 nm throughout. The same measurement has been made with respect to the samples of Comparative Examples 1, 7 and 9 and there could be seen almost no space, while the sample of Comparative Example 11 has shown a value of about 0.5 nm. In Tables II–VI, portions denoting only hyphens indicate no measurement made.

As will be clear when the measurement data of Example 1 and Comparative Examples 1 and 2 as well as Example 7 and Comparative Examples 3 and 5 are compared with one another, it has been found that, according to the method of the present invention, the pillars 12 specifically in the case of the inorganic pillar material attains larger hole volume and extremely smaller heat conductivity. It should be also appreciated that, as further comparison between Comparative Examples 3 and 5 and between carried out renders the hole volume to be larger and the heat conductivity smaller but, when compared with corresponding data according to the present invention, the hole volume is still smaller and the heat conductivity is also still larger even when the calcination has been carried out. Further, it is also seen that, as will be clear when Example 16 and Comparative Examples 7 and 8 as well as Example 21 and Comparative Examples 9 and 10 are compared with one another, the porous member can be of a larger hole volume and extremely smaller heat conductivity when made according to the present invention, even where no pillar is inserted or only organic pillar material is used.

As will be clear when Examples 29–45 and Examples 1–25 are compared with each other, further, the present invention allows it possible to obtain a particularly excellent inorganic porous member when the synthetic saponite is used.

Figure 11:
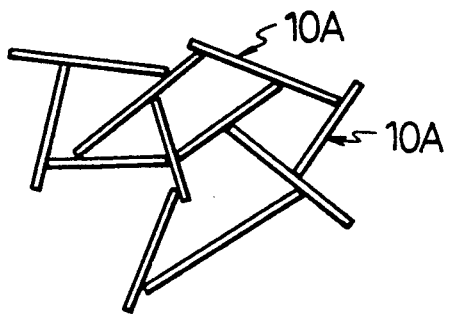
FIG. 11 is a schematic explanatory view for the structure of the inorganic porous member obtained through the method according to the present invention.

It will be further appreciated that the inorganic porous member according to the method of the present invention can be prepared in such that the layered inorganic compound 10A with or without the pillars 12 inserted between the compound layers as has been referred to with reference to FIGS. 5, 7, 9 and 10 can be dried without involving any condensation or the like and many holes can be formed between the respective layers of the inorganic compound 10A, as shown in FIG. 11. Similar tendency can be expected irrespective of the presence or absence of the pillars inserted between the layers of the inorganic compound.

In respect of some of the foregoing Examples and Comparative Examples, further, two deodorization experiments have been carried out respectively with each of trimethylamine and methyl mercaptan employed as an odor component.

In first one of the experiments, 0.3 g of the sample inorganic porous member was put in a conical flask 20 of 300 ml, and the flask was sealed with a plug 21. Then, 1 ml of trimethylamine (of 9.48 vol. %) was poured in the flask, and thereafter a sampling of 0.5 ml per minute was investigated by means of gas chromatography. When this analysis has resulted in a complete deodorization, that is, the gas chromatographic measurement has shown 0 ppm, the above operation was repeated, and, when no complete deodorization was reached, the sampling time period was extended and required time until the deodorization was first achieved was detected.

In second one of the experiments, 0.3 g of the sample was put in a conical flask 20 of 300 ml similar to that of the first experiment, and the flask was sealed with the plug 21. Methyl mercaptan (of 9.16 vol. %) was diluted to be 100 times, 5 ml of this diluted methyl mercaptan was poured into the flask 20, contents of which were left for 1 minute and then subjected to UV radiation, 1 ml sampling was taken and subjected to gas chromatographic measurement. In the experiment made with respect to Examples 1, 16, 21, 26-28, and 39 and Comparative Example 11, required time until the complete deodorization (0 ppm of the gas chromatographic measurement) was detected. In the experiment with respect to Comparative Examples 1, 7 and 9, the measurement has not reached 0 ppm and required time for causing the measurement stabilized by the UV radiation to be substantially at a fixed low level as well as the measuring time by means of the gas chromatography were detected.

TABLE VII

| Ex. No. | Odor Comp. (methyl mercaptan) | Odor Comp. (trimethylamine) |
|---|---|---|
| 1 | 5 min. (0 ppm) | Deodorized in a moment (up to 50 ml) |
| 16 | 3 min. (0 ppm) | Deodorized in a moment (up to 50 ml) |
| 21 | 3 min. (0 ppm) | Deodorized in a moment (up to 50 ml) |
| 26 | 3 min. (0 ppm) | Deodorized in a moment (up to 50 ml) |
| 27 | 3 min. (0 ppm) | Deodorized in a moment (up to 50 ml) |
| 28 | 3 min. (0 ppm) | Deodorized in a moment (up to 50 ml) |
| 39 | 3 min. (0 ppm) | Deodorized in a moment (up to 50 ml) |
| 46 | 3 min. (0 ppm) | Deodorized in a moment (up to 50 ml) |
| Comp. Ex. No. | | |
| 1 | 40 min. (0.1 ppm) | 20 min. |
| 7 | 40 min. (0.1 ppm) | 20 min. |
| 9 | 40 min. (0.1 ppm) | 21 min. |
| 11 | 3 min. (0 ppm) | 44 min. (0.0001 ppm was still detected) |

It has been found in view of the above experiments that, with the inorganic porous member according to the present invention, a remarkably excellent deodorizing effect can be attained in addition to the excellent heat insulation property because of the large hole volume and small heat conductivity. In this connection, it will be appreciated that, as will be clear when Example 21 is compared with its corresponding Comparative Example 9, an excellent deodorizing effect can be attained in addition to the high heat insulation property even in an event where only the organic pillar material is employed as the pillars while the drying is made in the super critical state for removing such material out of the interlayer spaces of the porous member. It has been also found that, as will be clear when Example 16 is compared with corresponding Comparative Example 9, the excellent heat insulation property as well as the excellent deodorization can be attained even when any pillar material is not employed at all. It has been found, on the other hand, that the activated charcoal has been remarkably deteriorated in the deodorizing effect with respect to trimethylamine.

What we claim as our invention is:

1. A method for preparing a multilayered structure of Na-montmorillonite, Ca-montmorillonite, 3-octahedron synthetic saponite, Na-hectorite, Li-hectorite, Na-taeniolite, Li-taeniolite, acid clay, synthetic mica or a mixture thereof, comprising the steps of:
   forming a solution containing a first solvent and an inorganic layer-forming material, the material becoming swelled in the solvent;
   mixing said solution with a quantity of pillar-forming material sufficient to form a multilayered structure of alternating layers formed from the layer-forming material and pillars formed from the pillar-forming material;
   substituting at least a second solvent for the first solvent, the second solvent having a critical temperature or critical pressure lower than that of the first solvent;
   separating the second solvent form the layer-forming and pillar-forming materials by subjecting the solution to drying at temperature and pressure conditions at or above the critical point of said second solvent, the solid residue from the drying step forming an inorganic porous composition having said multilayered structure;
   wherein the first solvent is water, methanol, ethanol, dimethylformamide, dimethylsulfoxide, acetone or a mixture thereof; and
   wherein said second solvent is methanol, ethanol, isopropanol, carbon dioxide, dichlorodifluoromethane or a mixture thereof.

2. A method according to claim 1, wherein the pillar-forming material mixed in the mixing step includes both organic and inorganic pillar-forming materials.

3. A method according to claim 2, wherein the inorganic material has at least part of its surface modified with at least one of a cationic inorganic compound or an alcoholate.

4. A method according to claim 2, the method including the step of removing the organic pillar-forming material prior to forming the inorganic porous composition.

5. A method according to claim 1, wherein the pillar-forming material is an organic material having at least part of its surface modified with at least one of a cationic inorganic compound or an alcoholate.

6. A method according to claim 1, wherein the pillar-forming material is an organic material.

7. A method for preparing a multilayered structure of Na-montmorillonite, Ca-montmorillonite, 3-octahedron synthetic saponite, Na-hectorite, Li-hectorite, Na-taeniolite, Li-taeniolite, acid clay, synthetic mica or a mixture thereof, comprising the steps of:
   forming a solution containing a first solvent and an inorganic layer-forming material, the material becoming swelled in the solvent;
   mixing said solution with a quantity of pillar-forming material sufficient to form a multilayered structure of alternating layers formed from the layer-forming material and pillars formed from the pillar-forming material;
   substituting a second solvent for the first solvent, the second solvent being methanol, ethanol, isopropanol or a mixture thereof and having a critical temperature or pressure lower than that of the first solvent;
   substituting a third solvent for the second solvent, the third solvent being carbon dioxide, dichlorodifluoromethane or a mixture thereof and having a critical temperature or critical pressure lower than that of the second solvent;
   separating the third solvent from the layer-forming and pillar-forming materials by subjecting the solution to drying at temperature and pressure conditions at or above the critical point of the third solvent, the solid residue from the drying step forming an inorganic porous composition having said multilayered structure.

8. A method according to claim 7, wherein the pillar-forming material mixed in the mixing step includes both organic and inorganic pillar-forming materials.

9. A method according to claim 8, wherein the inorganic material has at least part of its surface modified with at least one of a cationic inorganic compound or an alcoholate.

10. A method according to claim 8, wherein the pillar-forming material mixed in the mixing step includes both organic and inorganic pillar-forming materials.

11. A method according to claim 7, wherein the pillar-forming material is an inorganic material having at least part of its surface modified with at least one of a cationic inorganic compound or an alcoholate.

12. A method according to claim 7, wherein the pillar-forming material is an organic material.

* * * * *